United States Patent Office 2,746,033
Patented May 15, 1956

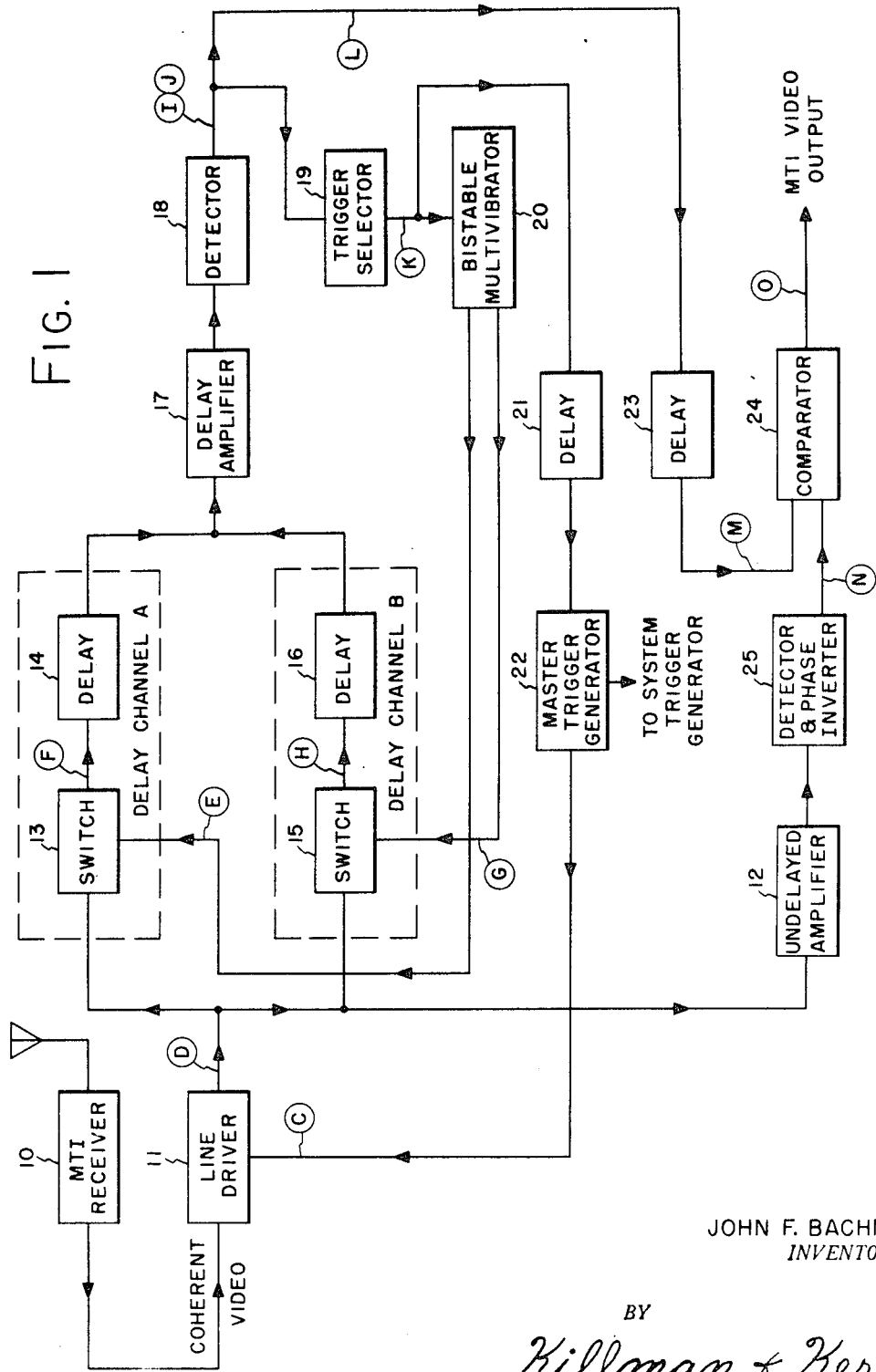

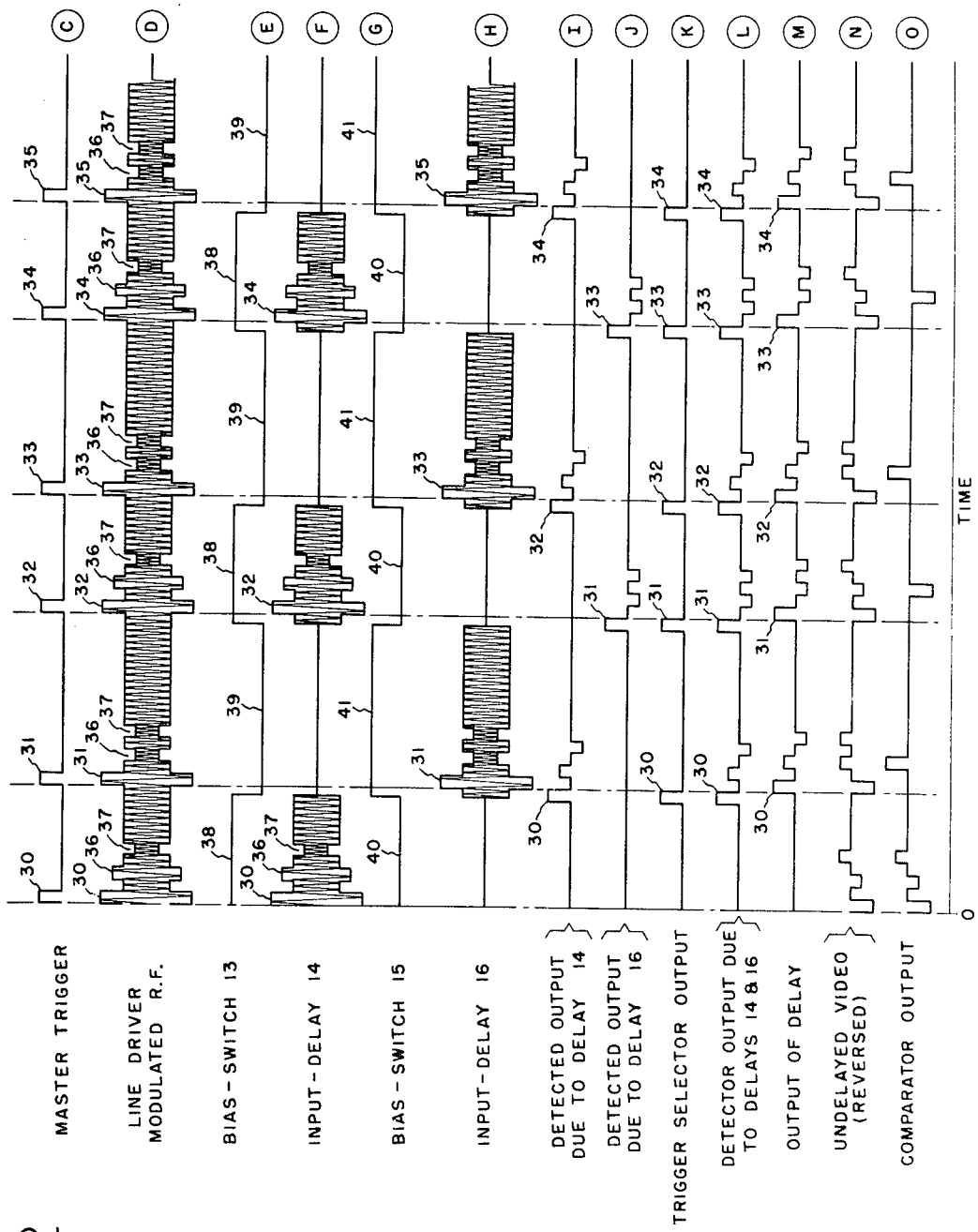

2,746,033

MOVING TARGET INDICATION SYSTEM

John F. Bachmann, Baltimore, Md., assignor to Bendix Aviation Corporation, Towson, Md., a corporation of Delaware Application December 13, 1950, Serial No. 200,635

8 Claims. (Cl. 343—7.7)

This invention relates to radio echo detection systems and particularly to those which distinguish between moving and fixed targets in their indications. Many of such systems operate by generating a coherent R. F. or I. F. reference signal and beating it with the R. F. or I. F. of the received echoes The video envelope of the resulting signal is then delayed for a pulse interval and compared in a subtractive sense with the video response from the following transmitted pulse. The resulting video envelopes from moving targets generally change in amplitude, pulse to pulse, and do not cancel completely. The remaining signal is displayed.

While these systems are adequate for most targets, they do possess certain limitations. One of these operates against the indication of targets moving at certain speeds. Whenever a target is moving radially, with respect to the system, at a speed which is a whole number of times a half-wave length of the radio frequency of the transmitted pulse, the resulting video pulses will have the same amplitude, pulse to pulse, and thus will be cancelled as though they were from fixed targets. These speeds are known as "blind" speeds.

This defect is dangerous in airport surveillance work under low ceiling conditions where it is important that every plane be visible. It is, of course, also dangerous in interceptor service and in any other work where the pick-up of every moving target is essential.

It is an object of the invention to reduce or eliminate blind speeds within the operating frequency range of a moving target indication system.

It is a further object of the invention to reduce or eliminate blind speeds with respect to a moving target indication system by alternating the pulse repetition frequency of the system between two values.

The portion of a wavelength of the radio frequency of the transmitted pulse that a target can travel between pulses is a function of the speed of the target, the wavelength of the radio frequency energy and the pulse repetition frequency of the system.

Of these, the target's speed obviously cannot be controlled.

A magnetron is usually employed in the transmitter as the transmitting oscillator. These tubes are mechanically tuned and do not lend themselves to rapid tuning. A change in wavelength would also result in fixed targets becoming visible during the change over period. Since the frequency change would have to be repeatedly made to avoid the establishment of new blind speeds on a permanent basis, it can be seen that this expedient would not be practical.

The only remaining variable is the pulse repetition frequency. The present invention contemplates the reduction or elimination of blind speeds by alternating the pulse repetition frequency between two values.

In the drawings:

Fig. 1 is a schematic diagram in block form of an MTI system embodying the invention; and, Fig. 2 consists of a plurality of time related waveforms occurring at various points in the circuit of Fig. 1.

Referring now more particularly to the circuit shown in Fig. 1, there is illustrated an MTI receiver 10, which may be of conventional nature. A plurality of possible receiver circuits is illustrated and described in Chapter 16 of the book entitled "Radar System Engineering" by Ridenour. This book is volume 1 of the Radiation Laboratory Series published in 1947, by McGraw-Hill Book Company, Inc., New York City.

The output of receiver 10 is applied to a line driver 11. This circuit is conventional and may consist of an R. F. oscillator modulated by the coherent video which comprises the output of receiver 10 and the master trigger voltage applied as indicated hereinafter. The modulated output of this oscillator is applied to three channels. Two of these are delay channel A and delay channel B indicated by dotted line boxes. The third comprises an amplifier 12 which does not act as a delaying means.

Delay channel A comprises a switch 13 and a delay line 14. The switch 13 controls the application of the output of line driver 11 to the delay line 14.

Delay channel B comprises a switch 15 similar to 13 and a delay line 16 which may be similar to delay line 14. The delay devices 14 and 16, although referred to as delay lines, may be translation devices employing any appropriate form of delay mechanism. Delay lines 14 and 16 have different delay times. For example, the delay line 16 may impose a delay which is in excess of that imposed by delay line 14 by 10%. This difference is not critical, being merely selected by way of illustration.

The outputs of delay lines 14 and 16 are applied to a delay amplifier 17, the output of which is applied to a detector 18.

The output of detector 18 is applied to a trigger selector 19. This device may be of a conventional nature and may comprise a translation stage which is biased to such an extent that it responds only to the trigger pulses found in the output of line driver 11. These pulses are normally of an amplitude which is considerably in excess of the amplitude of the video signals of that output.

The trigger pulses selected by the circuit 19 are applied as triggering voltage to a bi-stable multivibrator 20. This circuit is of the type that is also known as a "scale of two" circuit. It has two stable conditions and successive trigger pulses cause it to change from one stable condition to another.

Output voltages from this circuit are taken from two points which deliver voltages of opposite phase. These voltages are of the square wave type, being composed of alternate negative and positive going excursions. The output voltages being oppositely phased will be, at all times, of opposite polarity, that is, when one voltage is undergoing its negative excursion, the other will be undergoing its positive excursion and vice versa. Each of these output voltages is applied to a respective one of the switches 13 and 15.

The output of trigger selector 19 is also applied through a delay device 21 to a master trigger generator 22. This device generates impulses which are applied to a system trigger generator which triggers the transmitter of the radio echo system and is used wherever a trigger voltage synchronized with the pulse emission is required. The output of master trigger generator 22 is also applied to the line driver 11, appearing in the output of that circuit as the trigger voltages which are applied to the system through the delay channels A and B.

The output of detector 18 is also applied through a delay device 23 to a comparator 24. In this circuit the voltage just spoken of is compared with the output of undelayed amplifier 12 which has been detected and inverted in a detector and phase inverter 25. The voltages are compared in a subtractive sense which serves to eliminate the video response impulses from fixed targets, since these cancel, leaving only the indications from moving targets.

A consideration of the operation of the system of Fig. 1 will be facilitated by reference to the group of wave forms illustrated in Fig. 2. These curves represent wave forms occurring at different points throughout the circuit. Each has been designated by a reference letter and this letter has been applied to the portion or portions of the circuit of Fig. 1 to which it relates.

The master trigger voltage generated by generator 22 is depicted in curve C which shows a plurality of spaced pulses 30 to 35 inclusive. It will be noted that the pulses comprising this train are spaced sequentially by intervals of two alternate magnitudes which correspond to the different delays imposed by devices 14 and 16. The spacing between pulses 31 and 32, for example, is greater than that between pulses 30 and 31. These spacings correspond to time intervals between successive pulses transmitted by the radio echo system. The spacings are illustrated as differing in magnitude by fifty percent. This is an exaggeration which is made in order that the difference may be readily observable on the drawing.

Wave form D represents the output voltage of line driver 11. It will be noted that this wave form is modulated radio frequency, the modulation consisting of recurring groups of pulses. Each group consists of one of the trigger pulses of wave form C, followed by a pulse which has been indicated as 36. It will be noted that this pulse is of alternating polarity, being positive going where it occurs following the trigger 30, for example, and negative going following the trigger 31. This pulse represents the response from a moving target, and is the one that it is desired to have the system indicate to an observer.

Following the pulses 36 in each group is a negative going pulse 37. This pulse represents the response from a fixed target and it is desired that this impulse be eliminated from the final indication of the system. It will be noted in Fig. 1 that this wave form D is applied to switches 13 and 15 and to the amplifier 12.

Wave forms E and G represent the two outputs of the bi-stable multivibrator 20, each being applied to a respective one of the switches 13 and 15 as indicated. These voltages are applied as bias voltages, the switches being of an electronic nature, and they have the effect of rendering the switches alternatively conducting and non-conducting in opposition. The voltage E has positive going excursions 38 and negative going excursions 39. The voltage G has negative going excursions 40 occurring simultaneously with the positive going excursions 38 of wave form E and positive going excursions 41 occurring at the same time as negative going excursions 39 of wave form E.

Wave form F indicates the portion of the output of line driver 11 which is passed by the switch 13 to the delay device 14. Likewise wave form H indicates the portion of the output of line driver 11 which is passed by switch 15 to delay device 16.

The outputs of delay devices 14 and 16 are combined and applied through delay amplifier 17 to detector 18. The portion of the output of this detector which is due to delay device 14 is indicated by the wave form I, whereas the portion due to the delay device 16 is indicated by wave form J. The total output of detector 18 is indicated by wave form L.

The output of trigger selector 19 is indicated by wave form K. It will be noted that this wave form corresponds quite closely with wave form C, except that the pulses are advanced slightly in time. It will be noted also that each of the pulses has been delayed by substantially a pulse interval from the corresponding pulse of the wave form C. For example, pulse 30 of wave form K is in substantially the position of pulse 31 of wave form C. The output of trigger selector 19 is applied to delay device 21 and thence to master trigger generator 22 which produces the wave form C. This accounts for the slight delay exhibited by corresponding pulses of wave form C with respect to those of wave form K.

The wave form L is also applied to delay device 23, and from there to voltage comparator 24. It will be noted that this wave form is the envelope of the wave form D, each pulse group being delayed by one of the intervals between trigger pulses.

The output of line driver 11, or wave form D, which was applied to amplifier 12 is detected in detector and phase inverter 25 and the wave form N resulting from this action is applied also to the comparator 24. It will be noted that the pulse groups of the wave forms M and N coincide. The leading edge of each pulse group of wave form N is determined by the corresponding master trigger impulse of wave form C applied to the line driver 11. The delay applied to each of these triggers by the delay device 21, is applied in order to insure that the delay channels are switched before signals come through, and this, in turn, necessitates the presence of the delay device 23 which delays wave form M by the same amount in order that the pulse groups of the wave forms M and N may coincide exactly in time.

The wave forms M and N being compared in a subtractive sense in the comparator 24, the wave form O must necesssarily result. This wave form is the result of the cancellation of pulses of opposite polarity in the two wave forms M and N and the addition of the pulses 36 of identical polarity. These are the pulses which indicate the presence of a moving target.

The system disclosed will not eliminate blindness in a moving target indication system over an unlimited range of target speeds, but by proper selection of the amount of alteration of pulse repetition frequency the blind spots can be made to lie outside any target speed which will be encountered. For example, if the increment in the pulse interval applied by the system is such that the target, at a particular speed, travels an integral number of half wavelengths of the transmitted frequency during the increment, the system will remain blind at that speed. By selecting the ratio between the two pulse repitition frequencies, however, so that the distance travelled during the increment does not constitute an integral multiple of a half wavelength of the transmitted frequency at any target speed likely to be encountered blind spots can, for all practical purposes, be eliminated. This is entirely possible at the speeds of present day aircraft.

What is claimed is:

1. In a radio pulse echo system in which pulses of radiant energy transmitted by said system and reflected from targets are beat with a reference signal synchronized with the transmitted signal to provide a video output in which responses from moving targets vary in amplitude from pulse to pulse while responses from fixed targets remain constant in amplitude from pulse to pulse, each of said responses of said video output being then delayed by a pulse interval and compared with the corresponding undelayed response next following, means to prevent the occurrence of a relationship between the radial component of the speed of a target with respect to said system and the pulse repetition frequency of said system such that said target moves radially between illuminations by successive pulses a distance which is an integral multiple of a half wave length of the frequency of the energy of the transmitted signal, said means comprising a pair of delay devices imposing on signals applied thereto delays of differing magnitudes, means applying said video output in alternation to said delay devices, and means initiating the transmission of one of said pulses in uniform timed relationship to each application of said video output to said delay devices.

2. In a radio pulse echo system in which pulses of radiant energy transmitted by said system and reflected from targets are beat with a reference signal synchronized with the transmitted signal to provide a video output in which responses from moving targets vary in amplitude from pulse to pulse while responses from fixed targets remain constant in amplitude from pulse to pulse, each of said responses of said video output being then delayed by a pulse interval and compared with the corresponding undelayed response next following, means to prevent the occurrence of a relationship between the radial component of the speed of a target with respect to said system and the pulse repetition frequency of said system such that said target moves radially between illuminations by successive pulses a distance which is an integral multiple of a half wave length of the frequency of the energy of the transmitted signal, said means comprising a pair of delay devices imposing on signals applied thereto delays of differing magnitudes, means applying said video output in alternation to said delay devices, means initiating the transmission of one of said pulses in uniform timed relationship to each application of said video output to either of said delay devices, means combining and detecting the output of said delay devices, and means detecting said video output and combining it in a subtractive sense with the detected output of said delay devices.

3. In a radio pulse echo system in which pulses of radiant energy transmitted by said system and reflected from targets are beat with a reference signal synchronized with the transmitted signal to provide a video output in which responses from moving targets vary in amplitude from pulse to pulse while responses from fixed targets remain constant in amplitude from pulse to pulse, each of said responses of said video output being then delayed by a pulse interval and compared with the corresponding undelayed response next following, means to prevent the occurrence of a relationship between the radial component of the speed of a target with respect to said system and the pulse repetition frequency of said system such that said target moves radially between illuminations by successive pulses a distance which is an integral multiple of a half wave length of the frequency of the energy of the transmitted signal, said means comprising a pair of delay devices imposing on signals applied thereto delays of differing magnitudes, means applying said video output in alternation to said delay devices, a trigger impulse generating circuit, means combining the output of said trigger impulse generating circuit with said video output before its application to said delay devices, means combining and detecting the output of said delay devices, means selectively removing the envelope of the trigger impulses forming a part of the detected output of said delay devices and applying it to said trigger generator for the excitation thereof, and means initiating the transmission of one of said pulses in coincidence with the generation of each of said trigger impulses.

4. In a radio pulse echo system in which pulses of radiant energy transmitted by said system and reflected from targets are beat with a reference signal synchronized with the transmitted signal to provide a video output in which responses from moving targets vary in amplitude from pulse to pulse while responses from fixed targets remain constant in amplitude from pulse to pulse, each of said responses of said video output being then delayed by a pulse interval and compared with the corresponding undelayed response next following, means to prevent the occurrence of a relationship between the radial component of the speed of a target with respect to said system and the pulse repetition frequency of said system such that said target moves radially between illuminations by successive pulses a distance which is an integral multiple of a half wave length of the frequency of the energy of the transmitted signal, said means comprising a pair of delay devices imposing on signals applied thereto delays of differing magnitudes, means applying said video output in alternation to said delay devices, a trigger impulse pulse generating circuit, means combining the output of said trigger impulse generating circuit with said video output before its application to said delay devices, means combining and detecting the output of said delay devices, means selectively removing the envelope of the trigger impulses forming a part of the detected output of said delay devices and applying it to said trigger generator for the excitation thereof, means initiating the transmission of one of said pulses in coincidence with the generation of each of said trigger impulses, and means detecting said video output and combining it in a subtractive sense with the detected output of said delay devices.

5. Apparatus as set forth in claim 4, said means applying said video output in alternation to said delay devices comprising a switch means connected to the input of each of said delay devices and governing the application of said video output thereto, a switch actuating means, means applying said envelope of said trigger impulses to said switch actuating means, said switch actuating means being connected to each of said switches and being operative in response to the application of said trigger impulse envelope thereto to render said switches conductive and non-conductive in alternation and in opposition.

6. Apparatus as set forth in claim 4, said means applying said video output in alternation to said delay devices comprising an electronic switch means connected to the input of each of said delay devices and governing the application of said video output thereto, a switch actuating means comprising a bi-stable multivibrator, means connecting said switches to output points of opposite polarity on said multivibrator and means applying said envelope of said trigger impulses to the input of said multivibrator whereby each of said impulses shifts said multivibrator from one stable state to the other.

7. In a radio pulse echo system in which pulses of radiant energy reflected from targets are beat with a reference signal synchronized with the transmitted signal to provide a video output in which responses from moving targets vary in amplitude from pulse to pulse while responses from fixed targets remain constant in amplitude from pulse to pulse, each of said responses of said video output being then delayed by a pulse interval and compared with the corresponding undelayed response next following, means to prevent the occurrence of a relationship between the radial component of the speed of a target with respect to said system and the pulse repetition frequency of said system such that said target moves radially between illuminations by successive pulses a distance which is an integral multiple of a half wave length of the frequency of the energy of the transmitted signal, said means comprising means generating a train of impulses, means initiating the transmission of each of said pulses in synchronism with a respect one of said impulses, means combining said impulses with the video output of said receiver, means subjecting the video signals resulting from said combination sequentially to delays of differing durations, means recovering the envelope of said impulses from said delayed video signals and means applying said envelope to said impulse generating means as triggering voltage therefor.

8. In a radio pulse echo system in which pulses of radiant energy reflected from targets are beat with a reference signal synchronized with the transmitted signal to provide a video output in which responses from moving targets vary in amplitude from pulse to pulse while responses from fixed targets remain constant in amplitude from pulse to pulse, each of said responses of said video output being then delayed by a pulse interval and compared with the corresponding undelayed response next following, means to prevent the occurrence of a relationship between the radial component of the speed of a target with respect to said system and the pulse repetition frequency of said system such that said target moves radially between illuminations by successive pulses a distance which is an integral multiple of a half wave length of the frequency of the energy of the transmitted signal, said means comprising means alternating the pulse repetition frequency of the transmitted pulses of said system between two values and means correspondingly varying the delay applied to said video output in synchronism with said alternation of the values of said pulse repetition frequency.

References Cited in the file of this patent

UNITED STATES PATENTS

| | | |
|---|---|---|
| 2,415,095 | Varian | Feb. 4, 1947 |
| 2,422,135 | Sanders, Jr. | June 10, 1947 |
| 2,480,038 | Mason | Aug. 23, 1949 |
| 2,491,450 | Holmes | Dec. 13, 1949 |
| 2,523,283 | Dickson | Sept. 26, 1950 |
| 2,532,546 | Forbes | Dec. 5, 1950 |